INVENTOR
ALEXANDER DELLI PAOLI
BY
Whelan, Chasan, Litton, Marx, & Wright
ATTORNEYS 3,326,167
TANKER
Alexander Delli Paoli, Huntington Station, N.Y., assignor to Esso Research and Engineering Company, a corporation of Delaware
Filed Aug. 2, 1965, Ser. No. 476,238
8 Claims. (Cl. 114—74)

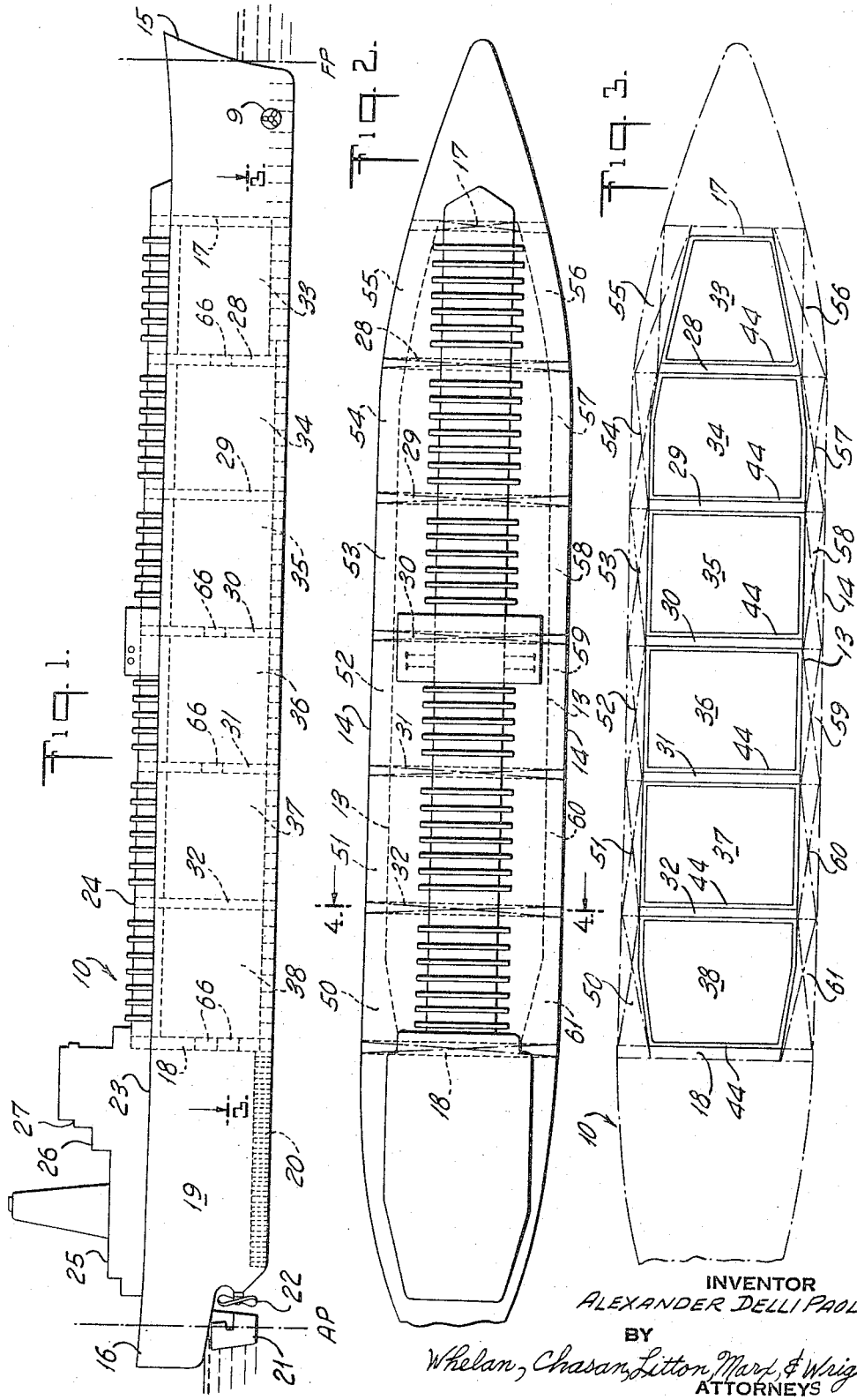

The present invention relates to marine vessels used in bulk transportation of liquefied natural gases while maintained at substantially atmospheric pressures and cryogenic temperatures.

The safe, efficient and economic storage and transportation of liquefied natural gas has presented numerous problems to shipbuilders, which are in a large measure due to the specific nature of the cargo itself. That is to say, the supercooled temperatures, for example, approximately −260° F. for liquefied methane at substantially atmospheric pressure, have necessitated the employment of special, impermeable insulating containers to prevent heat losses and ensuing vaporization of the cargo and to protect the ship structure itself from the potentially deleterious effects of the cryogenic cargo. The design of an economical, and relatively high speed, yet practical, tanker for carrying great amounts of liquefied natural gas in bulk, for example, as much as 250,000 barrels, has resulted in numerous departures from conventional tanker designs used in the transportation of fuel oil and other similar conventional liquid cargoes which are stored at ambient temperatures.

Heretofore, designs of liquefied natural gas (LNG) tankers have generally employed so-called independent "tanks" in which separate, self-supporting special steel or aluminum containers were incorporated into the cargo spaces of conventional tankers after the spaces or the tanks themselves had been thermally insulated. Alternatively, so-called "integrated" tank and insulation systems have been employed in which a cargo impermeable membrane and insulating panel members are supported directly by the ship structure in a predetermined array definitive of an insulated cryogenic cargo tank. It is to a tanker having an "integrated" cargo tank system that the present invention is directed.

An important aspect of the invention is the provision of a ship having both a substantially maximum volumetric efficiency (ratio of cargo tank volume to hull volume) and a corrected positive stability (center of gravity as corrected for free surface effects being located below the metacenter of the ship) during the loading or discharging of cargo and ballast onto or from the vessel. In other words, the ship of the invention is provided with a high LNG cargo capacity and has a positive stability regardless of the free liquid surfaces of its various liquid carrying tanks. More specifically, the ship will be stable regardless of the phase relation of the filling of the cargo tanks and exhausting of the ballast tanks or vice versa.

In the interests of maximizing tank capacity and reducing construction costs, it being understood that integrated or membrane tank constructions are space consuming as well as as being costly, the above-described cargo tanks extend transversely of the ship without interruption by longitudinal bulkheads of the type often found on oil tankers and other conventional vessels to reduce the free surface effects of the cargo. Because of the integrated construction, the use of longitudinal bulkheads to reduce the aforementioned free surface is not practical and any such bulkheads, necessarily, would be of the cofferdam type. These would be extremely costly and economically unfeasible. Thus it is possible for substantially large free surfaces to be present in the cargo tanks when they are not completely filled.

As a very important aspect of the invention, the design of the ballast tanks and cargo tanks in relation to the ship hull and to the specific gravity of the LNG cargo provides positive static stability at all conditions of loading and discharging cargo and ballast, i.e., at all levels in all tanks at all times. The maintenance of positive stability is of utmost importance in the safe operation of the vessel, especially when cargo is taken on board or discharged through a cargo arm which is positioned adjacent the ship, the conventional manner of handling cargo. While the cargo arms currently in use employ several sections of piping articulated by flexible couplings, providing it with certain limited degrees of freedom to accommodate normal, minimal ship movements, the cargo arm, as an entity, is maintained in an effectively fixed position relative to the tanker. More specifically, where the static stability of the ship during loading or discharging of cargo is or becomes negative (the center of gravity as corrected for free surface effects is or changes to a position above the metacenter of the ship), the vessel will assume a position in which it is heeled to either the port or starboard side. Where the heel is in the order of several degrees, the ship is dangerously unstable for the purposes of handling LNG, since any small disturbance may reverse its heel. For example, if the ship were heeled to the starboard, a small wave might cause it to heel rapidly to the port.

As will be understood, such a reversal would be extremely dangerous during the loading or discharging of cargo. The acceleration forces of the reversal acting through the relatively large moment arm of the ship beam, itself, and/or the magnitude of the physical change in position of the cargo manifold of the ship with respect to the fixed end of the arm may cause the failure of the cargo arm or cause the cargo arm itself to be torn loose from the ship. This would, of course, be disastrous, since the cryogenic cargo would spill onto the ship and would have an embrittling effect thereon. Moreover, as the spilled cargo vaporized, it would combine with the ambient air to form highly explosive mixtures, further jeopardizing the ship and endangering the crew.

The importance of having positive stability at all times is especially important and may be readily appreciated where cargo handling is to be carried out in open waters where waves and like disturbances are frequent and where there is a likelihood that cargo will be loaded and discharged while the ship is at a monomooring.

Thus, it is an object of the invention to provide an LNG tanker having positive stability regardless of the phase relation between the liquid levels in the ballast and cargo tanks.

It is a further object of the present inpention to provide an LNG tanker having an integrated cargo tank construction, which tanker will provide optimally maximum cargo carrying capacity commensurate with acceptable standards of seaworthiness, while being of a substantially low cost to build and to operate.

It is a still further object to provide an LNG tanker of the type described having an arrangement of integrated cargo tanks and ballast tanks which provides a maximum volumetric efficiency without impairing the static stability of the ship during the loading and discharging of cargo and ballast to or from the vessel.

Integrated membrane constructions, while being desirable for numerous reasons, are subject to certain limitations not found in independent tank constructions. For example, the membranes, being relatively thin, are necessarily limited in their strength. Accordingly, precautions must be taken to prevent the membrane structure from being subjected to excessive loads while in service. To that end and as an important aspect of the invention, dynamic stabilizing means in the nature of flume tanks are included in the cofferdams and in association with the cargo tanks to reduce the loading upon the membrane.

For a more complete understanding of the invention and its attendant advantages, reference should be made to the following detailed description, taken in conjunction with the accompanying drawings, in which:

FIG. 1 is a side elevational view of an LNG tanker embodying the principles of the invention;

FIG. 2 is a plan view of the tanker of FIG. 1;

FIG. 3 is a cross-sectional plan view of the tanker of FIG. 1 taken along line 3—3 thereof;

Figure 4:
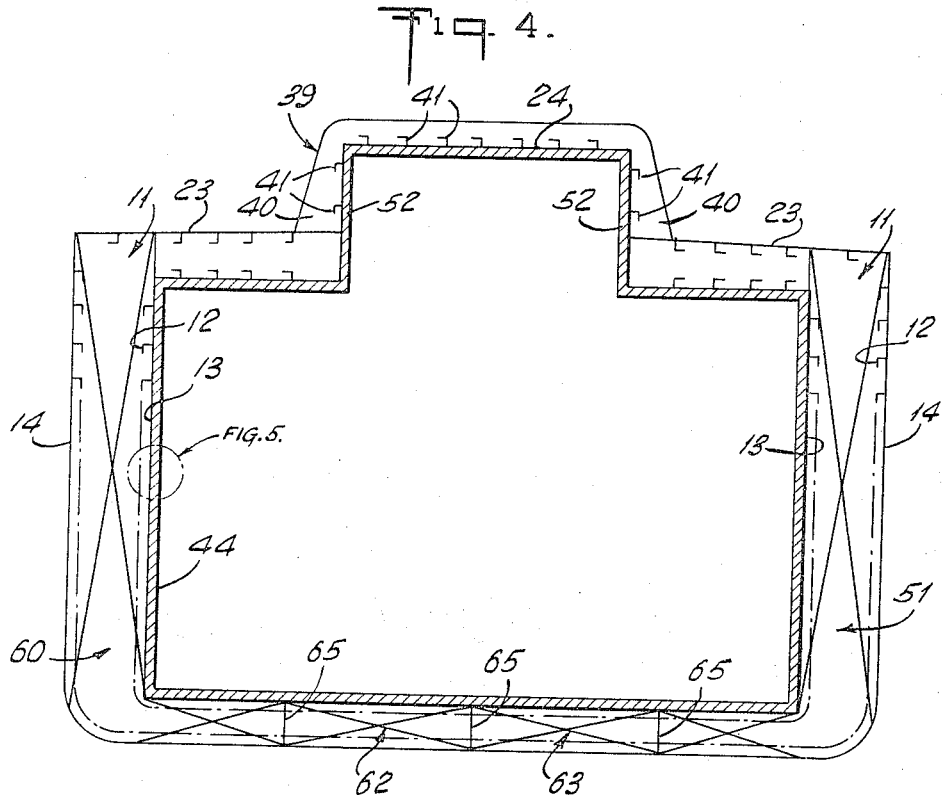
FIG. 4 is an enlarged, transverse cross-sectional view of the new tanker, taken along line 4—4 of FIG. 2.
Figure 5:
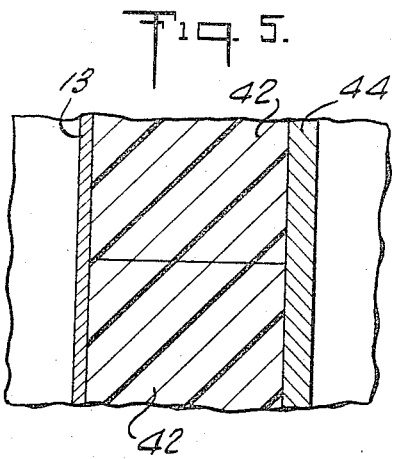
FIG. 5 is a further enlarged cross-sectional view of the integrated membrane tank construction.

Referring now to the drawings, the new and improved LNG tanker 10 of the invention is of double hulled construction. Specifically, the hull of the tanker is established by a series of internal transverse and longitudinal steel framing members 11, 12, supporting spaced inner and outer hull plating which defines an inner hull 13 and an outer hull 14, as shown best in FIG. 4.

As an important aspect of the invention, the size of the hull is unusually great for vessels of this type. For example, in the illustrated exemplary embodiment of the new tanker, which is capable of carrying approximately 250,000 barrels of LNG having a specific gravity of 0.54, the principal hull data includes the following:

| | |
|---|---:|
| Length overall (LOA) _____ft__ | 674 |
| Length between perpendiculars (LBP) _____ft__ | 640 |
| Beam, molded _____ft__ | 96 |
| Depth, molded to the main deck _____ft__ | 59¼ |
| Block coefficient _____ | 0.73 |

It should be understood that these dimensions and measures, as well as all dimensions and measures recited hereinafter, are given by way of example only, for the purposes of clear illustration and not as limitations upon the scope of the invention.

The bow and stern portions 15, 16, respectively, are of generally conventional configuration. As shown in the drawings, the bow portion 15 extends to a forwardmost cofferdam 17, a distance of approximately 79 feet aft of the forward perpendicular (FP), and includes a conventional fore peak tank and forward deep tanks (not shown). For increased maneuverability, a bow thruster 9 is included in the bow of the ship. The stern section 16 extends to an aftmost cofferdam 18, a distance of approximately 137 feet forward of the aft perpendicular (AP), and includes machinery space 19 for boilers, turbines, fuel tanks, steering gear, etc. Advantageously, the boilers are adapted to burn conventional fuel oil, as well as quantities of the LNG cargo which have been vaporized. Also included in the stern are the usual feed water tanks 20, rudder 21, and propeller 22. Above a main deck 23 of the hull, the topside silhouette includes a trunk deck 24, a control deck 25, a bridge deck 26, and a navigation bridge deck 27.

The midbody or cargo hold portions of the hull, that is, the portions included between the forwardmost and aftmost cofferdams 17, 18, are divided by intermediate cofferdams 28–32 into cargo tanks 33–38, each having a length between consecutive cofferdams of approximately 65 feet. The forwardmost and intermediate cofferdams 17 and 28–32 are of uniform length, approximately 4.5 feet, while the aftmost cofferdam 18 is slightly longer, approximately 6 feet. Thus, the cargo hold portions occupy the major portion (approximately 67%) of the length of the hull.

As shown in FIG. 4, the transverse section of the cofferdams includes a rectangular and relatively wide portion disposed below the main deck 23 and a narrow trunk portion extending above the main deck. As is customary, the cargo tanks are filled up into the trunk portions with LNG cargo when in service in order to reduce the size of the free liquid surface area of the cargo and to keep its associated unstabilizing free surface effects at substantially reduced and tolerable levels.

In accordance with the invention, the side walls of the cargo tanks 33–38 are generally defined by the inner hull structure, the cofferdam structure, and by an externally framed trunk structure 39. The transverse section of the cargo tanks will, of course, be similar to that of the cofferdams, giving the tank itself a relatively wide bottom and a narrow trunk. As will be understood, the cargo carrying capacity of the hull is maximized by the absence of longitudinal bulkheads within the cargo space, enabling the exemplary illustrated hull structure to carry optimally large quantities of LNG cargo in its tanks 33–38. The framing members 40 support plating definitive of the trunk deck 24 and the sides 52 of the trunk, which plating is externally stiffened by longitudinal framing members 41. The trunk sides 52 function as plate girders to support the main deck 23. It will be appreciated that this trunk structure strengthens the overall hull structure in an optimum manner while also defining the upper or trunked portions of the cargo tanks.

The cargo tanks are of "integrated" construction. That is to say, the structures which define the cargo tanks integrally support a relatively thin insulated barrier construction of approximately 11 inches in overall thickness (which is approximately 1 percent of the beam width in the illustrated embodiment of the invention) comprising insulating panels 42 advantageously of plastic foam, such as polyurethane or polyvinyl chloride, and superimposed metallic sheets 44, such as aluminum or stainless steel, having ductility at cryogenic temperatures. The integrated construction is designed to provide a double liquid and vapor impermeable cargo barrier in accordance with maritime regulatory codes. It should be understood that any particular membrane tank construction which provides the thermal insulating properties required to safeguard the ship structure, of which it is an integral part, and to maintain an LNG cargo in its liquefied state at substantially atmospheric pressure may be incorporated into the tanker of the present invention.

As another important aspect of the invention, the effects of loading of the cargo upon the relatively thin membrane structure defined by the metallic sheets 44, while the vessel is in service, may be effectively reduced by the inclusion of flumes 66 in several of the cofferdam tanks which define the transverse walls of the cargo tanks. More specifically, in the wide beam membrane tank constructions contemplated, ship roll of a substantial degree will substantially increase the hydrostatic head of the cargo with respect to the lowest corners of the cargo tank during the roll, since the effective height (difference between the highest and lowest elevation of the cargo) of the liquid column in the tank is increased during a roll. If the ship is pitching and/or heaving in addition to rolling, the effect of the hydrostatic head upon the membrane is further increased by a multiple of the hydrostatic head. As an important aspect of the invention, the magnitude of the hydrostatic head of the cargo in the tanks is minimized, thus minimizing the corresponding effects of pitching and heaving, by providing dynamic stabilizing means in the form of flume tanks in association with the integrated cargo tanks. As should be understood, the stabilizing medium of the flume tanks acts in opposition to the unstabilizing rolling forces of waves to reduce rolling thereby reducing increases in the hydrostatic head within the membrane tank.

As shown in FIG. 1, the flumes 66 are located in cofferdams 18, 28, 30 and 31, and they comprise transverse ducts having orifices or nozzles therein, which ducts are partially filled with water. The specific size of the free surface of the water in the ducts and the disposition and size of the orifices may be readily determined by conventional naval architectural design procedures. The reduction of the magnitude of the loading upon the relatively thin barrier panels provided by the inclusion of flume structures represents one of the many safety measures incorporated in the overall new and improved tanker design.

Specifically, and in accordance with the invention, the beam of the cargo tanks at midship, exclusive of insulation (tanks 35–37) for a cargo having a specific gravity of 0.54 is approximately 80% of the beam of the ship. In other words, the ship is unusually wide in comparison with the width of its cargo tanks. However, this particular arrangement, as well as the provision of a large number of relatively wide wing ballast tanks and double bottom ballast tanks which will be described hereinafter, provides the requisite positive stability for a high speed, high capacity ship of the general type described to enable all of its cargo tanks and ballast tanks to be loaded and discharged simultaneously without regard to the phase relation. That is to say, it is not necessary to load or discharge the cargo tanks, one at a time, nor is it necessary that the rate of taking on ballast be precisely the same as the rate of discharging cargo or vice versa, in order to maintain positive stability. As discussed hereinabove, failure to ensure positive stability at all times during loading may result in the heeling of the vessel and the consequent failure of a cargo loading arm.

The ballast system of the new tanker includes twelve relatively wide wing ballast tanks 50–61 and twelve bottom ballast tanks 62, 63, in addition to the seven transverse cofferdam tanks 17, 18 and 29–32. The longitudinal walls of the wing and bottom tanks are defined by the inner and outer hull plating, while the transverse end walls of the tanks as well as the vertical walls between adjacent tanks are defined by additional plating 65.

As an important aspect of the invention, the legs of the wing tanks (FIG. 4) are sufficiently wide to provide a ratio of the wing tank width to the overall ship beam on the order of 18 percent. In the illustrated embodiment, the width of the wing tanks is approximately 9.1 feet in the leg portions. It will be understood that the large number of ballast tanks (thirty-one in all) serves to minimize the free surface effects of the ballast liquids on board and thus contributes greatly to the desired positive stability (static) of the ship.

In accordance with the invention, each cargo tank is substantially enveloped by a plurality of ballast tanks (six in number) having at least one ballast tank adjacent all but its top sides. As is conventional, the ballast tanks are adapted to be filled with a ballast medium, typically sea water, as the tanker discharges cargo and conversely to discharge the ballast medium as the ship takes on cargo. The wing ballast tanks 50–61 are substantially J-shaped in their transverse section and include leg portions extending adjacent the longitudinal sides of the cargo tanks and foot portions extending beneath the outermost portions of the cargo tanks. Extending from each of the wing tanks to the centerline of the ship are pairs of bottom tanks 62, 63, as shown clearly in FIG. 4. Thus the bottom of the double hull is transversely divided into four ballast tanks comprising the foot portions of the wing tanks and the pairs of bottom ballast tanks. This division enhances the positive stability of the ship by providing four relatively small liquid free surfaces at the lowest levels of ballast and allows the ratio of cargo tank width to beam to be optimally maximized at about 80 percent.

It will be appreciated that the ship of the invention is capable of a high speed, high capacity operation, it having a block coefficient of approximately 0.73 and a cargo tank capacity of approximately 250,000 barrels. Moreover, through the limitation of the ratio of cargo tank width to beam and the provision of unusually wide wing tanks having a ratio of width to midship beam of approximately 18 percent, the ship will have a center of gravity corrected for the large free surfaces of the cargo in the full width cargo tanks as well as for the smaller free surfaces in the flumes. It should be understood, of course, that free surface effect of the flume stabilizing system while beneficially reducing the loading upon the membrane structure of the cargo tanks during normal sea conditions, does tend to reduce positive static stability. However, the negative effect of the flume free surfaces has been considered along with the free surfaces of the other liquid containing tanks on board the vessel.

Furthermore, it should be appreciated that provision of a multiplicity of ballast tanks enveloping the cargo hold space further reduces the deleterious effects on positive stability of the ballast liquids. Thus the inclusion of a large number of ballast tanks including unusually wide wing ballast tanks and the limitation of the width of the membrane cargo tanks ensures positive static stability under all conditions of loading and discharging cargo and ballast regardless of the rate differences therebetween.

The specific tanker structure herein illustrated and described is intended to be representative only, as certain changes may be made therein without departing from the clear teachings of the disclosure. For example, without the inclusion of flume stabilizing means, the desired 250,000 barrel capacity may be had with a ship of somewhat smaller overall dimensions than those set out hereinabove. As a further example, in a ship having the overall hull dimensions described hereinabove, elimination of the flumes would enable the cargo tank widths to be slightly increased, the ballast tank widths to be slightly decreased by a commensurate amount thereby increasing the cargo carrying capacity of the vessel. Accordingly, reference should be made to the following appended claims in determining the full scope of the invention.

What is claimed is:

1. A tanker for storing and transporting liquefied natural gases at substantially atmospheric pressures and cryogenic temperatures comprising
   (a) a double hull structure of predetermined beam, depth, and length,
   (b) a plurality of cofferdam ballast tanks disposed at midbody portions of said hull and defining in said hull a predetermined number of cargo tanks therebetween,
   (c) thermal insulating means and cargo impermeable membrane means lining said cargo tanks,
   (d) said cargo tanks being uninterrupted by longitudinal bulkhead structure and extending transversely of said hull structure,
   (e) said cargo tanks and cofferdam tanks comprising at least approximately 67% of the length of said hull,
   (f) the ratio of the width of said cargo tanks to the beam of said hull structure at said midbody portions is a maximum of approximately 80%,
   (g) a pair of J-shaped wing ballast tanks of predetermined width formed in said double hull having upper leg portions adjacent the longitudinal sides of each of said cargo tanks and lower transversely extending foot portions beneath the outermost bottom portions of said cargo tanks, and said leg portions having a width of not less than approximately 18% of the midship beam of the hull,
   (h) a pair of bottom tanks contiguous with the lower foot portions of each pair of said wing ballast tanks,
   (i) said bottom tanks being formed in the bottom of said hull beneath the central bottom portions of said cargo tanks,
   (j) whereby said pairs of wing and bottom ballast tanks provide four separate ballast tanks across the bottom of said hull structure,
   (k) said tanker having a positive stability under all conditions of loading and discharging cargo.

2. A tanker in accordance with claim 1, in which
   (a) at least 67% of the cargo tanks in said midbody portions have maximum widths of approximately 80% of the beam of said hull.

3. A tanker in accordance with claim 1, in which
  (a) six cargo tanks are formed in said hull, and
  (b) a total of thirty-one ballast tanks substantially envelop said six cargo tanks.

4. A tanker in accordance with claim 1, in which
  (a) said thermal insulating means and cargo impermeable membrane means comprise not substantially more than approximately 2% of the midship beam of said hull.

5. A tanker in accordance with claim 1, in which
  (a) said cargo tanks have a capacity of at least approximately 250,000 barrels of LNG,
  (b) said hull form has a block coefficient of approximately 0.73.

6. A tanker in accordance with claim 1, in which
  (a) at least one of said cofferdams includes flume stabilizing means.

7. A tanker for storing and transporting liquefied natural gases at substantially atmospheric pressures and cryogenic temperatures comprising
  (a) a double hull structure of predetermined beam, depth, and length,
  (b) a plurality of cofferdam ballast tanks disposed at midbody portions of said hull and defining in said hull a predetermined number of cargo tanks therebetween,
  (c) thermal insulating means and cargo impermeable membrane means lining said cargo tanks,
  (d) said cargo tanks being uninterrupted by longitudinal bulkhead structure and extending transversely of said hull structure,
  (e) the ratio of the width of said cargo tanks to the beam of said hull structure at said midbody portions is a maximum of approximately 80%,
  (f) a pair of J-shaped wing ballast tanks of predetermined width formed in said double hull having upper leg portions adjacent the longitudinal sides of each of said cargo tanks and lower transverse foot portions extending beneath the outermost bottom portions of said cargo tanks, and said leg portions having a combined width of not less than approximately 18% of the midship beam of the hull,
  (g) a pair of bottom tanks contiguous with the lower foot portions of each pair of said wing ballast tanks,
  (h) said bottom tanks being formed in the bottom of said hull beneath the central bottom portions of said cargo tanks,
  (i) whereby said pairs of wing and bottom ballast tanks provide four separate ballast tanks across the bottom of said hull structure,
  (j) said tanker having a positive stability under all conditions of loading and discharging cargo.

8. A tanker for transporting liquefied gases at substantially atmospheric pressures and cryogenic temperatures comprising
  (a) a double hull structure of predetermined beam, depth, and length,
  (b) a plurality of spaced cofferdam ballast tanks disposed transversely of said hull and defining in said hull a predetermined number of cargo holds therebetween,
  (c) a plurality of cargo tanks surrounded by thermal insulating means within said cargo holds,
  (d) and a plurality of individual flume stabilizing means for reducing the roll of said tanker, said stabilizing means being located in the space defined by said cofferdam ballast tanks, at least one of said ballast tanks including two individual flume stabilizing means positioned vertically one above the other.

References Cited
UNITED STATES PATENTS

| | | | |
|---|---|---|---|
| 3,021,808 | 2/1962 | Henry | 114—74 |
| 3,101,861 | 8/1963 | Mearns et al. | 114—74 |
| 3,160,136 | 12/1964 | Ripley | 114—125 |
| 3,164,120 | 1/1965 | Field | 114—125 |

MILTON BUCHLER, *Primary Examiner.*

T. M. BLIX, *Assistant Examiner.*